United States Patent
Jones

(10) Patent No.: US 6,698,688 B1
(45) Date of Patent: Mar. 2, 2004

(54) APPARATUS AND METHODS FOR ACTUATING ROTATABLE MEMBERS

(75) Inventor: Kelly T. Jones, Snohomish, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/426,400

(22) Filed: Apr. 29, 2003

Related U.S. Application Data

(60) Provisional application No. 60/420,668, filed on Oct. 22, 2002.

(51) Int. Cl.[7] ............................................. B64C 13/28
(52) U.S. Cl. .................. 244/75 R; 244/215; 244/45 A; 244/89; 244/48; 74/99 R
(58) Field of Search ........................ 244/7 C, 213–216, 244/48, 45 A, 75 R, 88, 89, 5 C, 6 C, 12.4; 74/99 R–99 A

(56) References Cited

U.S. PATENT DOCUMENTS

| | | | | |
|---|---|---|---|---|
| 2,370,893 A | * | 3/1945 | Utsch | 244/215 |
| 2,430,793 A | * | 11/1947 | Wells | 244/45 A |
| 3,874,617 A | * | 4/1975 | Johnson | 244/216 |
| 4,121,483 A | | 10/1978 | Sedlock | |
| 4,482,108 A | * | 11/1984 | Sutton | 244/48 |
| 4,497,461 A | | 2/1985 | Campbell | |
| 4,763,862 A | * | 8/1988 | Steinhauer et al. | 244/215 |
| 5,722,615 A | * | 3/1998 | Bilange et al. | 244/45 A |
| 6,371,408 B1 | | 4/2002 | Halwes | |
| 6,450,050 B1 | | 9/2002 | Luo et al. | |
| 6,520,717 B1 | | 2/2003 | Otto et al. | |
| 6,572,209 B2 | | 6/2003 | Koepff et al. | |

* cited by examiner

Primary Examiner—Galen L. Barefoot
(74) Attorney, Agent, or Firm—Black Lowe & Graham

(57) ABSTRACT

Apparatus and methods for actuating rotatable members are disclosed. In one embodiment, an assembly for actuating a rotatable member includes an extendible actuator having a first end and a second end, and a drive member having a first portion pivotally coupled to the second end, and a second portion non-pivotally coupled to the rotatable member. The second portion of the drive member is spaced apart from the first portion. The drive member further includes a third portion spaced apart from the first and second portions in a non-linear orientation. The assembly further includes a reaction link having an anchoring end pivotally coupled to the first end of the extendible actuator, and a driving end pivotally coupled to the third portion of the drive member.

50 Claims, 6 Drawing Sheets

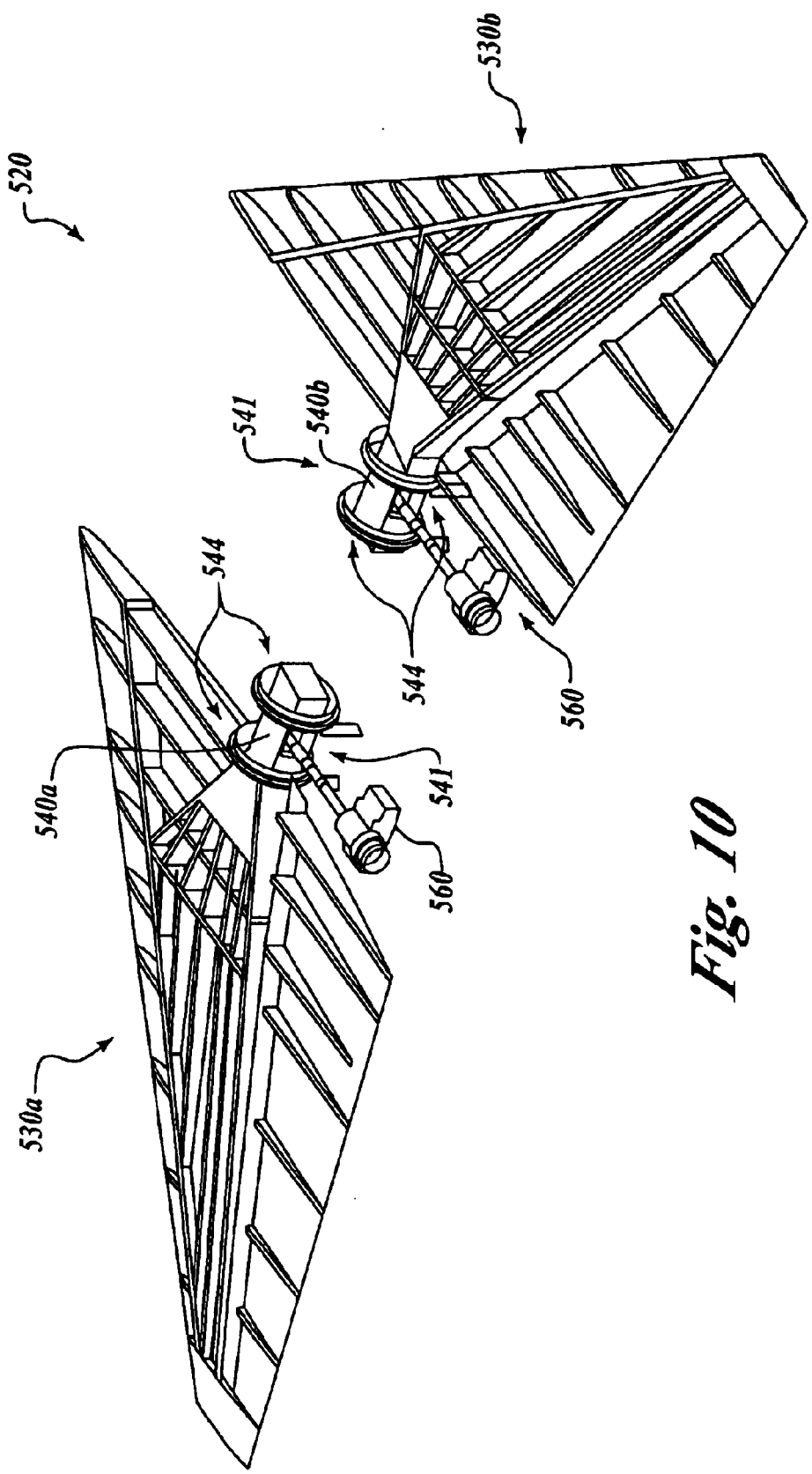

APPARATUS AND METHODS FOR ACTUATING ROTATABLE MEMBERS

CROSS REFERENCE TO RELATED APPLICATIONS

This patent application is a continuation-in-part of commonly-owned U.S. Provisional Patent Application No. 60/420,668 filed on Oct. 22, 2002 entitled "Method and Apparatus for Installing and Actuating Movable Airfoils, Such as Canards", which application is hereby incorporated by reference.

FIELD OF THE INVENTION

The present disclosure relates to apparatus and methods for actuating rotatable members and, more specifically, for actuating rotatable aircraft control surfaces.

BACKGROUND OF THE INVENTION

Many existing commercial and military aircraft include a pressurized fuselage, a wing assembly positioned toward a middle portion of the fuselage, and a tail assembly positioned aft of the wing assembly. The tail assembly typically includes horizontal control surfaces that provide pitch control, and vertical control surfaces that provide yaw control. The tail assembly may be mounted to an unpressurized empennage attached to an aft portion of the fuselage. Alternately, some aircraft are equipped with canard surfaces that are mounted on the fuselage at locations forward of the wing assembly and which provide the desired pitch stability and control. Regardless of the location of the control surface on the aircraft, many existing control surfaces (pitch and yaw) may be actuated by rotating a rotatable member (e.g. a drive shaft). Typically, the rotation of the rotatable member causes a corresponding deflection or rotation of the control surface, thereby providing the desired pitch or yaw control.

A side elevational view of a conventional actuator assembly 20 for actuating a rotatable control surface 22 is shown in FIG. 1. The actuator assembly 20 includes a longitudinally-extendible actuator 24 that is extendible in a first direction 26, and retractable in a second direction 28. The actuator 24 has a first end 30 pivotally coupled at a first point A to a first end 32 of a drive arm 34. A second end 36 of the drive arm 34 is non-pivotally (e.g. rigidly) coupled to a drive shaft 38 (shown in end view in FIG. 1) at a second point B. The drive shaft 38 is, in turn, coupled to the control surface 22.

As shown in FIG. 1, a second end 40 of the actuator 24 is pivotally coupled at a third point C to a first end 44 of a hangar link 42. A second end 46 of the hangar link 42 is pivotally coupled at a ground point G to a relatively stationary support 48 (e.g. an airframe). The actuator assembly 20 further includes a reaction link 50 having a first end 52 pivotally coupled to the second point B, and a second end 54 pivotally coupled to the third point C. Alternately, for applications that require increased torque, the drive arm 34 may extend beyond the second point B, and the reaction link 50' may be pivotally coupled to the second end 36' of the elongated drive arm 34' at an alternate point B'.

In operation, as the actuator 24 is extended in the first direction 26, a force is exerted on the drive arm 34 that, coupled with a corresponding force in the reaction link 50, causes a rotation of the drive shaft 38, thereby rotating the control surface 22 in a first rotational direction 52. Similarly, when the actuator 24 is retracted in the second direction 28, the combination of forces in the drive arm 34 and the reaction link 50 cause the drive shaft 38, and thus the control surface 22, to rotate in a second rotational direction 54. Because the second end 46 of the hangar link 42 is pivotally coupled at the ground point G, the third point C may translate in the first and second directions 26, 28 during actuation of the actuator 24. Thus, actuation loads provided by the actuator 24 are close-coupled to local structure through the reaction link 50, which is conventionally attached to the second point B, or to the alternate point B' that is co-linear with the first and second pivot points A and B. Similarly, torsional loads are reacted by the hangar link 42. The actuator assembly 20 shown in FIG. 1 is of a type commonly-known as a "walking beam" kinematic linkage assembly.

Although desirable results have been achieved using the conventional actuator assembly 20, continued advances in aircraft technology are placing increased demands on such assemblies. For example, in some advanced aircraft configurations, particularly those being developed for transonic and supersonic flight conditions, it may be desirable to provide relatively large canard surfaces for optimal pitch control, while at the same time reducing the size of the aircraft fuselage cross-section to minimize drag. These factors may tend to increase the load requirements on the actuator assembly, while at the same time increasing the demand for more effective utilization of space within the aircraft. Thus, there is an unmet need to provide actuator assemblies that more fully satisfy the competing demands being presented by continued advances in aircraft technology.

SUMMARY OF THE INVENTION

The present invention is directed to apparatus and methods for actuating rotatable members. Apparatus and methods in accordance with the present invention may advantageously decrease the amount of space occupied by such apparatus in comparison with the prior art. When used in aircraft, the apparatus and methods disclosed herein may therefore provide improved utilization of space within the aircraft.

In one embodiment, an assembly for actuating a rotatable member includes an extendible actuator having a first end and a second end, and a drive member having a first portion pivotally coupled to the second end, and a second portion non-pivotally coupled to the rotatable member. The second portion of the drive member is spaced apart from the first portion. The drive member further includes a third portion spaced apart from the first and second portions in a non-linear orientation. The assembly further includes a reaction link having an anchoring end pivotally coupled to the first end of the extendible actuator, and a driving end pivotally coupled to the third portion of the drive member.

BRIEF DESCRIPTION OF THE DRAWINGS

The preferred and alternative embodiments of the present invention are described in detail below with reference to the following drawings.

FIG. 10 is an enlarged, partially-sectional isometric view of a canard assembly of an aircraft in accordance with an alternate embodiment of the invention.

DETAILED DESCRIPTION OF THE INVENTION

The present invention relates to apparatus and methods for actuating rotatable members. Many specific details of certain embodiments of the invention are set forth in the following description and in FIGS. 2–10 to provide a thorough understanding of such embodiments. One skilled in the art, however, will understand that the present invention may have additional embodiments, or that the present invention may be practiced without several of the details described in the following description.

Figure 1:
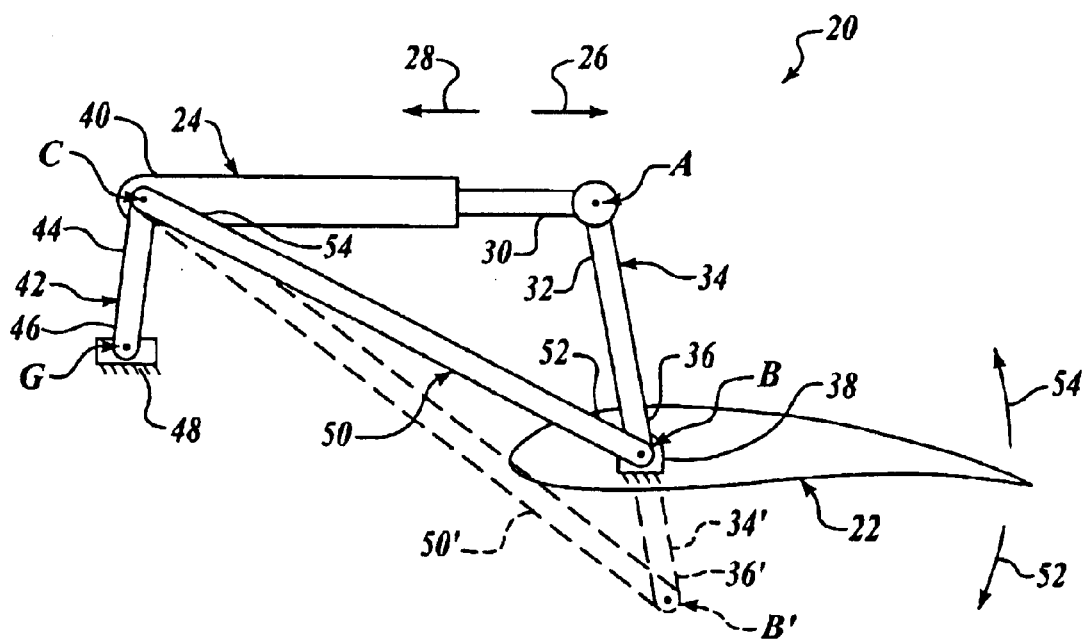
FIG. 1 is a side elevational schematic view of an actuator assembly coupled in accordance with the prior art.
Figure 2:
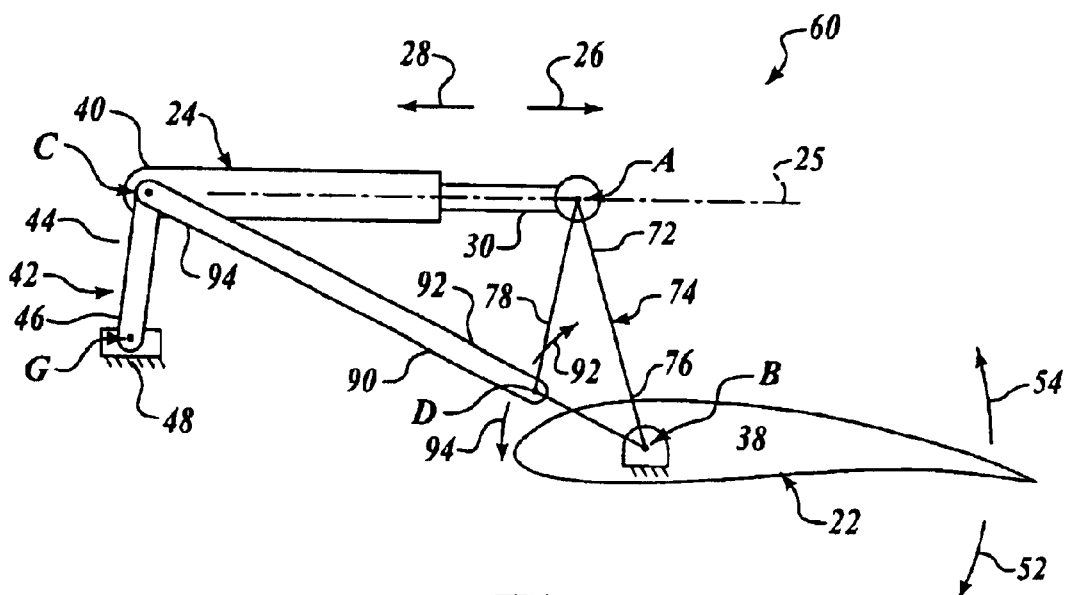
FIG. 2 is a side elevational schematic view of an actuator assembly in accordance with an embodiment of the invention.

FIG. 2 is a side elevational schematic view of an actuator assembly 60 in accordance with an embodiment of the invention. It will be appreciated that the actuator assembly 60 may include many of the same components as the prior art actuator assembly 20 shown in FIG. 1. In the embodiment of the actuator assembly 60 in accordance with the invention, however, a pivot point D between a first end 92 of a reaction link 90 and a drive member 74 is not co-linear with the line between points A-B, as described more fully below.

As shown in FIG. 2, the actuator assembly 60 includes a longitudinally-extendible actuator 24 that is extendible in a first direction 26, and retractable in a second direction 28. The actuator 24 has a first end 30 pivotally coupled at a first point A to a first portion 72 of a drive member 74. As further shown in FIG. 2, the drive member 74 includes a second portion 76 that is non-pivotally (e.g. rigidly) coupled to a drive shaft 38 (shown in end view in FIG. 2) at a second point B. The drive shaft 38 is, in turn, coupled to a control surface 22. Furthermore, a second end 40 of the actuator 24 is pivotally coupled at a third point C to a first end 44 of a hangar link 42, and a second end 46 of the hangar link 42 is pivotally coupled at a ground point G to a relatively stationary support 48. The actuator assembly 60 further includes a reaction link 90 having a first end 92 pivotally coupled to a third portion 78 of the drive member 74 at a fourth point D. A second end 94 of the reaction link 90 is pivotally coupled to the third point C.

In the embodiment shown in FIG. 2, the drive member 74 is an approximately triangularly-shaped member, such as an approximately triangularly-shaped plate. In alternate embodiments, the drive member 74 may be a frame member, or any other suitably-shaped plate or member. It will be appreciated, however, that the third portion 78 of the drive member 74 is not linearly aligned (co-linear) with the first and second portions 72, 76. In other words, unlike the prior art actuator assembly 20 (FIG. 1), a line extending through the first point A and the second point B does not pass through the fourth point D. As shown in the side elevational view of FIG. 2, the first, second, and fourth points A, B, and D are oriented in a triangular (that is, non-linear) orientation. Thus, the drive member 74 may be virtually any desired shape that allows the first, second, and fourth points A, B, and D to be positioned in anon-linear orientation.

It will be appreciated that the actuator 24 may be any type of longitudinally-extendible actuator. For example, the actuator 24 may be a hydraulic actuator, an electric actuator, a pneumatic actuator, a mechanically-driven actuator, or virtually any other type of actuator. Also, the actuator 24 should be positioned such that an actuator axis 25 does not intersect a longitudinal axis of the drive shaft 38 (extending out of the page in FIG. 2) so that extension of the actuator 24 along the actuator axis 25 may provide a force that rotates the drive shaft 38.

Furthermore, in alternate embodiments, the various components of the actuator assembly 20 may be approximately co-planar, or one or more components may be laterally offset from other components in various non-planar arrangements. For example, the drive member 74 may be approximately co-planar with the extendible actuator but laterally offset from the reaction link 90, in which case the third and fourth points C and D shown in FIG. 2 may be end views of shafts or other connecting members. Alternately, the drive member 74 may be approximately co-planar with the reaction link 90 but laterally offset from the actuator 24, in which case the first and third points A and C may be end views of shafts or other connecting members. In a further embodiment, the drive member 74 may be laterally offset from both the reaction link 90 and the actuator 24, in which case the first and fourth points A and D may be end views of shafts. Of course, in still another embodiment, the drive member 74, the reaction link 90, and the actuator 24 may all be approximately co-planar.

In operation, as the actuator 24 is extended in the first direction 26, a force is exerted on the drive member 74 that combines with a corresponding (or opposing or balancing) force in the reaction link 90, thereby causing a rotation of the drive shaft 38 (and the control surface 22) in a first rotational direction 52. As the drive shaft 38 rotates in the first rotational direction 52, the fourth point D (i.e. the pivot point between the reaction link 90 and the drive member 74) also rotates in a third rotational direction 92. Similarly, when the actuator 24 is retracted in the second direction 28, the combination of forces in the drive member 74 and the reaction link 90 cause the drive shaft 38 (and the control surface 22) to rotate in a second rotational direction 54. As the drive shaft 38 rotates in the second rotational direction 52, the fourth point D simultaneously rotates in a fourth rotational direction 94. As described above, the third point C may translate in the first and second directions 26, 28 during actuation of the actuator 24 because the second end 46 of the hangar link 42 is pivotally coupled at the ground point G.

The actuator assembly 60 may provide advantages over the prior art actuator assembly 20 (FIG. 1). For example, because the pivot point between the reaction link 90 and the drive member 74 (i.e. the fourth point D) is not coincident with the pivot point between the drive members 74 and the drive shaft 38 (i.e. the second point B), the actuator assembly 60 may provide improved rotational torque compared with the prior art actuator assembly 20. Similarly, the actuator assembly 60 may advantageously utilize less space than the prior art actuator assembly 20, especially where the prior art includes an extended drive arm 34' having a second end 36' that extends beyond the drive shaft 38 (FIG. 1) and pivotally couples to an extended reaction link 50' at a pivot point B' that is not coincident with the drive shaft 38. Thus, the actuator assembly 60 in accordance with the invention may provide improved utilization of space, such as, for example, within an interior portion of an aircraft.

Figure 3:
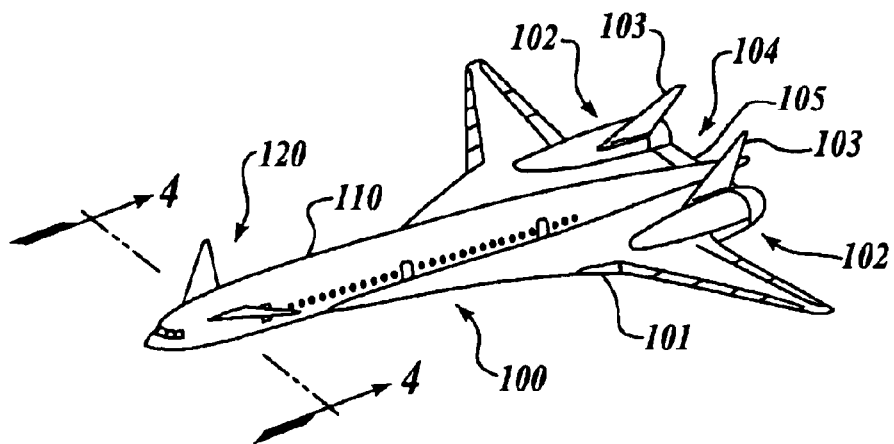
FIG. 3 is an isometric view of an aircraft having a canard assembly in accordance with an embodiment of the invention.

One possible implementation of the actuator assembly 60 in accordance with the invention is in aircraft having forwardly-positioned control surfaces or canards. For example, FIG. 3 is an isometric view of an aircraft 100 that includes a canard assembly 120 in accordance with an embodiment of the invention. The canard assembly 120 is attached to a fuselage 110 of the aircraft 100, forward of an aft-mounted wing 101. As shown in FIG. 3, the aircraft 100 includes propulsion systems 102 integrated with the wing 101, and canted tails 103 mounted at least proximate to the propulsion systems 102 to provide yaw stability and control. An aft body 104 is positioned between the propulsion systems 102 and includes pitch control surfaces 105 which, together with the canard assembly 120, provide pitch stability and control authority for the aircraft 100.

It will be appreciated that the aircraft 100 shown in FIG. 3 is simply one example of an aircraft that can be equipped with actuator assemblies in accordance with the invention. The inventive apparatus and methods disclosed herein may also be employed for actuating control surfaces in a wide variety of other types of aircraft, including, for example, conventional commercial passenger aircraft, such as the 737, 747, 757, 767, and 777 models commercially-available from The Boeing Company. Furthermore, apparatus and methods in accordance with the present invention may also be employed in missiles, unmanned vehicles, rotary aircraft, and various military aircraft, including those described, for example, in The Illustrated Encyclopedia of Military Aircraft by Enzo Angelucci, published by Book Sales Publishers, September 2001.

Figure 4:
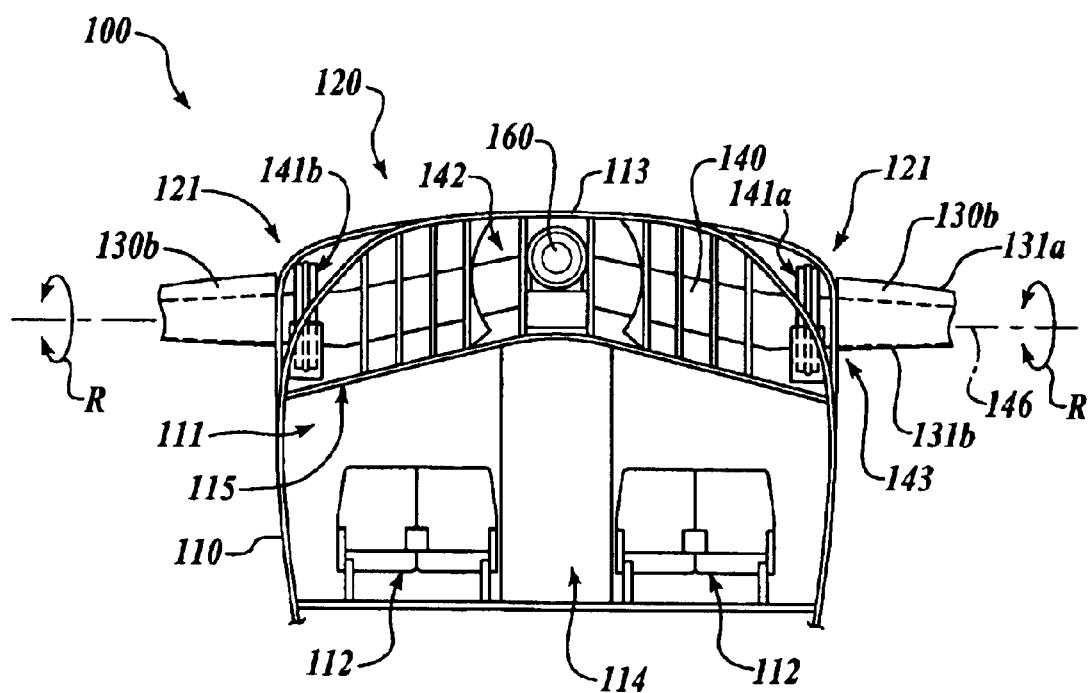
FIG. 4 is an enlarged, cross-sectional view of a portion of the aircraft of FIG. 3 taken substantially along line 2—2.

FIG. 4 is an enlarged, cross-sectional view of a portion of the aircraft 100 of FIG. 3 taken substantially along line 2—2. As shown in FIG. 2, the fuselage 110 can include a pressurized cabin 111 having passenger seating 112, one or more aisles 114, galleys, and other features typical of passenger aircraft. Alternately, such passenger accommodations may be omitted, and the cabin 111 may be unpressurized. The fuselage 110 can further include a canard housing 113 (pressurized or un-pressurized) positioned above the passenger cabin 111. In this embodiment, a ceiling 115 is positioned between the pressurized cabin 111 and the canard housing 113. As described more fully below, the canard housing 113 can be sized and positioned to movably support the canard assembly 120 while advantageously preserving a large volume for the pressurized cabin 111.

With continued reference to FIG. 4, the canard assembly 120 includes two airfoil portions 130 (shown as a left airfoil portion 130a and a right airfoil portion 130b). Each airfoil portion 130 can include a first or upper surface 131a and a second or lower surface 131b. The airfoil portions 130 can be connected with a connecting portion 140 (such as a spindle) that extends between the airfoil portions 130 through the canard housing 113. Accordingly, the airfoil portions 130 extend external to the fuselage 110, and the connecting portion 140 extends internal to the fuselage 110. An interface region 121 of the canard assembly 120 can be aligned with an external wall of the fuselage 110, between the external portions and the internal portions of the canard assembly 120.

In this embodiment of the canard assembly 120, the connecting portion 140 includes two attachment portions 141 (shown as a left attachment portion 141a and a right attachment portion 141b). The attachment portions 141 couple the connecting portion 140 to the fuselage 110 while allowing the connecting portion 140 and the airfoil portions 130 to move relative to the fuselage 110. For example, in one embodiment, the connecting portion 140 and the airfoils 130 can rotate as a unit about a rotation axis 146, as indicated by arrows R. Accordingly, the connecting portion 140 can be coupled to an actuator assembly 160 for active rotation about the rotation axis 146.

In one particular aspect, the rotation axis 146 can pass through the interface region 121, and through a minimum cross-sectional area 143 of the connecting portion 140. In another aspect, the connecting portion 140 can include an intermediate region 142 positioned between the attachment portions 141 directly along the rotation axis 146, or alternately, the intermediate region 142 may be offset vertically away from the rotation axis 146, as shown, for example, in FIG. 4. In yet another aspect, the intermediate region 142 can have a cross-sectional area that is the same as, or larger than, that of the minimum cross-sectional area 143. As will be described more fully below, the foregoing features can reduce the impact of the airfoil portions 130 and associated actuation systems on the volume of the pressurized cabin 111.

Figure 5:
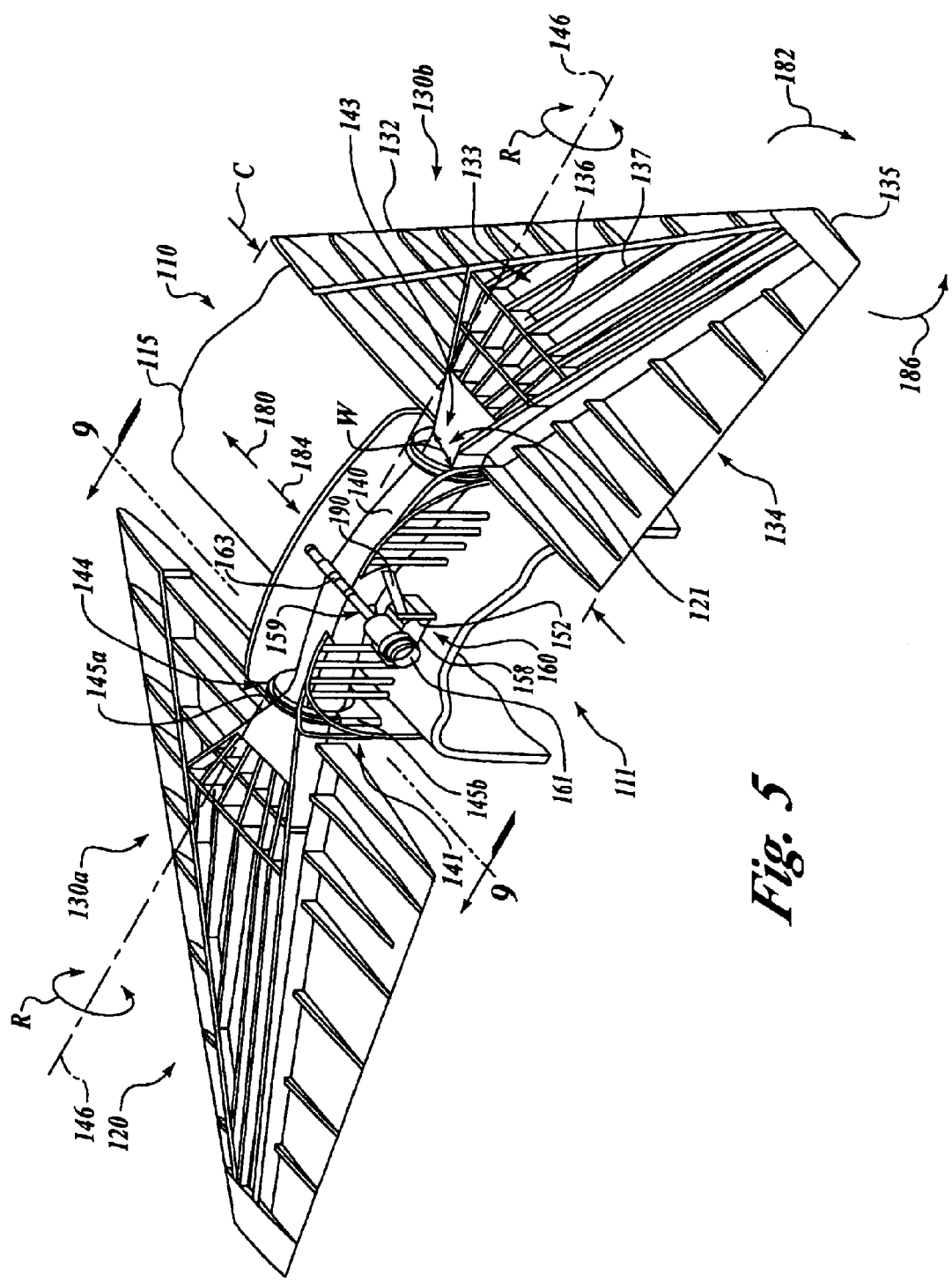
FIG. 5 is an enlarged, partially-cutaway, top isometric view of a canard assembly of the aircraft of FIG. 3.

FIG. 5 is an enlarged, partially-cutaway, top isometric view of a portion of the aircraft 100 of FIG. 3. As shown in FIG. 5, the airfoil portions 130 of the canard assembly 120 each include a central portion 133, a leading edge 132 forward of the central portion 133, a trailing edge device 134 (e.g., an elevator) aft of the central portion 133, and an outboard tip 135. In one aspect, the trailing edge device 134 can be movable relative to the central portion 133, for example, to provide trim control for the airfoil portion 130. Accordingly, the trailing edge device 134 can be operatively coupled to an actuator (not shown in FIG. 5) positioned in the central portion 133, while the central portion 133 provides pitch control. As a result, the central portion 133 can be actuated at a relatively-faster rate than the trailing edge device 134. This is unlike some conventional aft-mounted tail arrangements where an all-moving (and relatively slow moving) tail provides trim control, and a relatively faster-moving trailing edge elevator provides pitch control. In other embodiments, the trailing edge can be fixed relative to the central portion 133. In still further embodiments, the leading edge 132 can be movable relative to the central portion 133.

As further shown in FIG. 5, the airfoil portions 130 can include longitudinal spars 136 and/or transverse stringers 137 arranged to enhance the strength and integrity of the structure. In one aspect, the stringers 137 of the central portion 133 can converge as they extend in board toward the fuselage 110. In a further aspect, the stringers 137 can be integrally connected to the connecting portion 140 to provide a strong structural link between the connecting portion 140 and the airfoil portions 130. In alternate embodiments, the airfoil portions 130 may include other structural arrangements, such as, for example, a laminated core construction.

In the embodiment shown in FIG. 5, the connecting portion 140 of the canard assembly 120 has its minimum cross-sectional area 143 positioned proximate to the interface region 121 between the portion of the canard assembly 120 external to the fuselage 110 and the portion of the canard assembly 120 internal to the fuselage 110. The minimum cross-sectional area 143 can have a width W (e.g. in a chordwise direction) that is relatively small compared to a maximum chord length C of the airfoil 130. For example, in one aspect of this embodiment, the width W can have a value that ranges from about 5% to about 15% of the maximum chord length C. In a particular embodiment, the width W can have a value of about 7% of the maximum chord length C. The rotation axis 146 may pass through the minimum cross-sectional area 143. Accordingly, the maximum excursion of any point on the connecting portion 140 relative to its neutral position may be relatively small, even when the airfoil portions 130 rotate through relatively large angular deflections.

Furthermore, in one exemplary embodiment, the airfoil portions 130 can rotate through a total angular deflection of about 40° relative to the neutral position. In a particular aspect of this embodiment, the total angular deflection can include about 15° of upward excursion (e.g. with the leading edge 132 deflected upwardly relative to its neutral position by 15°) and about 25° of downward deflection (e.g. with the leading edge 132 deflected downwardly from its neutral position by 25°). In other embodiments, the airfoil portions 130 can rotate through other angular ranges, an&or the angular ranges can have different upward and/or downward components. In any of these embodiments, the impact of these deflections on the available volume of the pressurized cabin 111 can be relatively small because, for example, (a) the connecting portion 140 has a relatively small cross-sectional area relative to the maximum chord length of the airfoil portions 130, and (b) the rotation axis 146 passes through the interface region 121 and the minimum cross-sectional area 143.

In the embodiment of the aircraft 100, the attachment portions 141 (FIG. 5) each include a bearing 144 positioned to allow rotational motion of the connecting portion 140. Each bearing 144 includes an arcuate first bearing surface 145a depending from the connecting portion 140 and engaged with an arcuate second bearing surface 145b depending from the fuselage 110. The bearing 144 may include, for example, a ball bearing arrangement, a roller bearing arrangement, or any other suitable bearing arrangement. The bearing 144 accommodates the rotational motion of the connecting portion 140 and the airfoil portions 130 relative to the fuselage 110.

Figure 6:
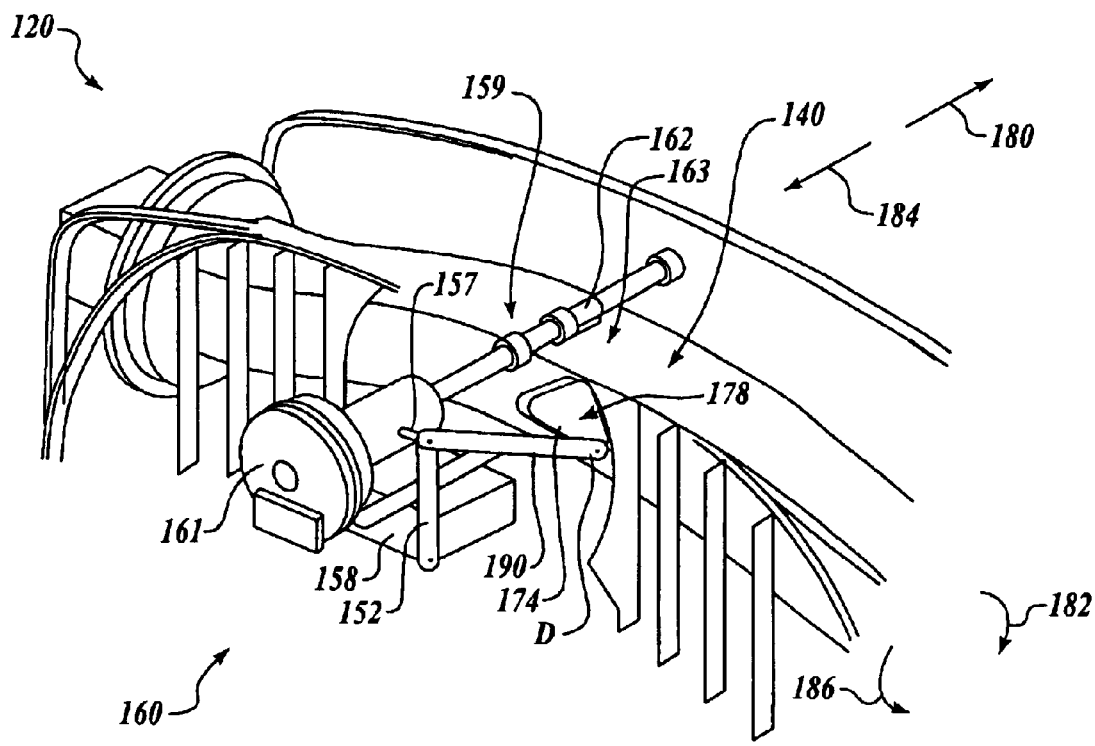
FIG. 6 is an enlarged, partial isometric view of an actuator assembly of the canard assembly of FIG. 5.
Figure 7:
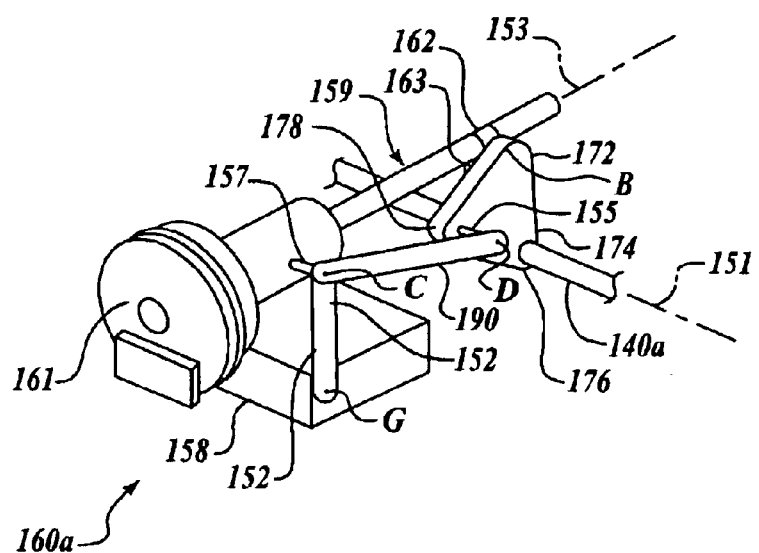
FIG. 7 is an enlarged, partial isometric view of the actuator assembly of FIG. 6 in accordance with an embodiment of the invention.

FIG. 6 is an enlarged, partial isometric view of an actuator assembly 160 of the canard assembly 120 of FIG. 5. The actuator assembly 160 partially shown in FIGS. 5 and 6 may be an actuator assembly 160 in accordance with the invention, such as the actuator assembly 60 described above and shown in FIG. 2. Alternately, the actuator assembly 160 may have one or more components that are laterally offset from other components. For example, FIG. 7 is an enlarged, partial isometric view of an actuator assembly 160a of FIG. 6 in accordance with one embodiment of the invention. The actuator assembly 160a includes an actuator 159 having a rotary motor 161 coupled to a ball screw 162. The ball screw 162 can engage a corresponding ball nut 163 which may be coupled to a first portion 172 of a drive member 174. Similarly, a second portion 176 of the drive member 174 may be non-pivotally coupled (e.g. rigidly coupled) to a drive shaft portion 140a of the connecting portion 140. The actuator 159 is positioned such that an actuator axis 153 does not intersect a longitudinal axis 151 of the drive shaft portion 140a of the connecting portion 140. Thus, extension of the actuator 159 along the actuator axis 153 may provide a force that rotates the drive shaft portion 140a.

As further shown in FIG. 7, a reaction link 190 is pivotally coupled to a first end 154 of a hangar link 152, and the hangar link 152 is pivotally coupled at a ground point G to a relatively stationary support 158. The reaction link 190 (and hangar link 152) are also coupled to the actuator 159 by a first connecting member 157 extending between the actuator 159 and a third pivot point C. The reaction link 190 is also pivotally coupled to a third portion 178 of the drive member 174 via a second connecting member 155 extending between the third portion 178 and a fourth pivot point D. In the embodiment of the actuator assembly 160 shown in FIG. 7, the reaction link 190 is laterally offset from the actuator 159 and the drive member 174.

Figure 8:
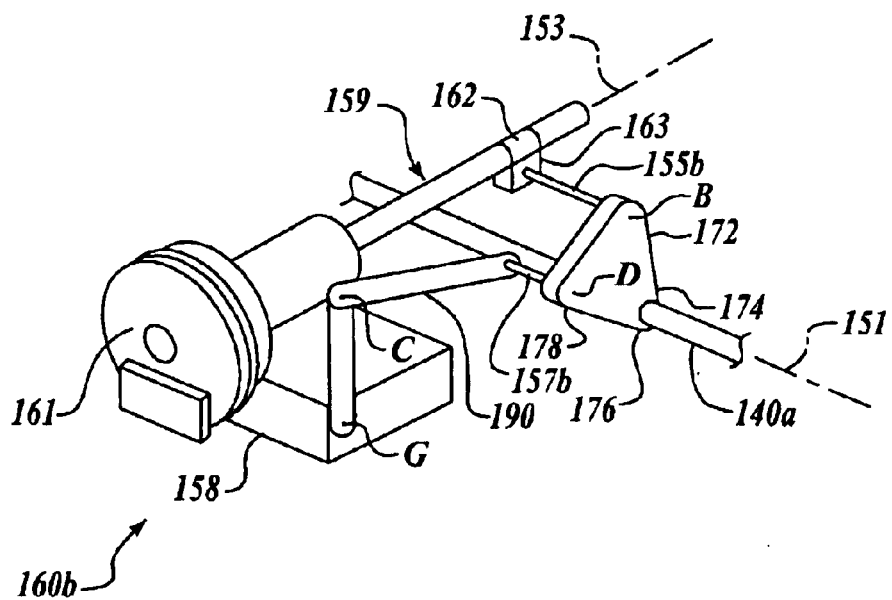
FIG. 8 is an enlarged, partial isometric view of the actuator assembly of FIG. 6 in accordance with an alternate embodiment of the invention.

In yet another embodiment, the drive member 174 may be laterally offset (or non-planar) from the reaction link 190 and the actuator 159. For example, FIG. 8 is an enlarged, partial isometric view of an actuator assembly 160b of FIG. 6 in accordance with another embodiment of the invention. As shown in FIG. 8, the reaction link 190 and actuator 159 are approximately co-planar, however, the drive member 174 is laterally offset therefrom. Specifically, the drive nut 163 is coupled to the first portion 172 of the drive member 174 by a first connecting link 155b (coupled to a pivot point A), and the reaction link 190 is coupled to the third portion 178 of the drive member 174 by a second connecting link 157b. Although the first and second connecting links 155b, 157b are depicted as simple shaft members in FIG. 8, in alternate embodiments, a variety of suitable designs, forms, and structures may be employed.

In operation, as the shaft of the motor 161 rotates, the ball screw 162 threadedly engages the ball nut 163, driving the ball nut 163 forward and aft along an arcuate path. As the actuator 159 drives the ball nut 163 in a forward direction 180, a force is exerted on the drive member 174 that combines with a force in the reaction link 190 to cause a rotation of the drive shaft 140a of the connecting member 140, and thus the airfoil portions 130 (FIG. 5), in a first rotational direction 182. Conversely, as the actuator 159 drives the ball nut 163 in an aft direction 184, the actuator assembly 160 rotates the drive shaft 140a of the connecting member 140 (and the airfoil portions 130) in a second rotational direction 186.

In one or more exemplary embodiments, the actuator 160 can operate at relatively high rates. For example, in alternate embodiments, the actuator 160 may drive the airfoil portions 130 at a rate of about 20° per second, or about 40° per second, or even higher rotational rates. Similarly, the ball screw 162 may rotate at rates up to and above 900 rpm to provide the desired rapid rotation rate of the airfoil portions 130. In further embodiments, the actuator assembly 160 can include other arrangements and can operate at other speeds. For example, the actuator assembly 160 may include a linear actuator and/or a rack and pinion arrangement.

Figure 9:
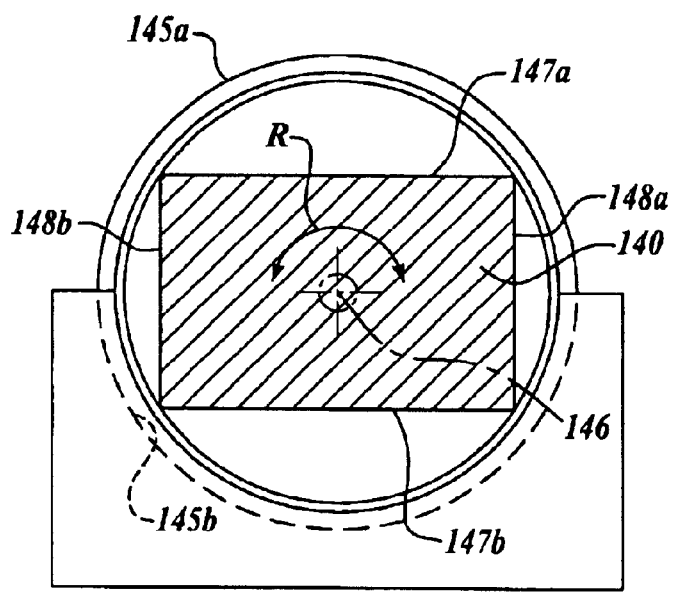
FIG. 9 is an enlarged, side cross-sectional view of part of a connecting portion taken substantially along line 4—4 of FIG. 5.

FIG. 9 is an enlarged, side cross-sectional view of part of the connecting portion 140 taken substantially along line 4—4 of FIG. 5. As shown in FIG. 9, the connecting portion 140 can have a generally rectangular cross-sectional shape, and in other embodiments, the connecting portion 140 can have other cross-sectional shapes. Furthermore, the connecting portion 140 may be configured to carry bending loads from the airfoil portions 130 (FIG. 5) to the fuselage 110. For example, when the airfoil portions 130 are subjected to vertical loads, the connecting portion 140 can transmit bending loads along first and second vertical load paths 147a and 147b. When the airfoils 130 are subjected to longitudinal loads, the connecting portion 140 can transmit loads along first and second longitudinal load paths 148a, 148b. As shown in FIG. 9, the rotation axis 146 can be positioned between any pair of load paths to provide for a compact arrangement with a relatively low rotational moment of inertia.

The canard assembly 120 including the actuator assembly 160 in accordance with an embodiment of the invention may provide several advantages over the prior art. As set forth above, because the pivot point between the reaction link 190 and the drive member 174 is not coincident with the pivot point between the drive member 174 and the connecting portion 140, the actuator assembly 160 may take up less space than the prior art actuator assembly 20, especially where the prior art includes an extended drive arm 34' having a second end 36' that extends beyond the drive shaft 38 (FIG. 1) and pivotally couples to an extended reaction link 50' at a pivot point B' that is not coincident with the drive shaft 38. Thus, the actuator assembly 60 in accordance with the invention may provide improved utilization of space, such as, for example, within an interior portion of an aircraft. Similarly, the actuator assembly 160 may provide improved rotational torque compared with the prior art actuator assembly 20.

Another advantage of the canard assembly 120 is that the connecting portion 140 has a relatively small cross-sectional area, and a relatively small width W compared to the maximum chord length C of the airfoil portions 130 that it supports. An advantage of this feature is that the connecting portion 140 occupies a relatively small volume within the fuselage 110, while still providing adequate support to the airfoil portions 130. Accordingly, the spatial impact of the connecting portion 140 on the volume of the pressurized cabin 111 is relatively small. This is unlike some existing canard attachment arrangements for which the structure passing into the aircraft fuselage has a width of from about 50% to about 75% of the maximum chord length of the corresponding airfoil.

Another feature of an embodiment of the canard assembly 120 described above is that the rotation axis 146 passes through the interface region 121, the minimum cross-sectional area 143, and/or a region between the load paths that carry loads from the airfoil portions 130 to the fuselage 110. Accordingly, points on the connecting portion 140 remain relatively close to the rotation axis 146 as the airfoil portions 130 rotate. This is unlike some existing canard attachment arrangements for which the attachment structure is pivoted at its extreme forward or aft edge and accordingly sweeps out a large volume as it rotates.

An advantage of arrangements in accordance with embodiments of the present invention is that the impact of the connecting portion 140 on the volume of the pressurized cabin 111 can be substantially less than with conventional arrangements, even though the airfoil portions 130 rotate through a relatively large angular range. Another advantage of this arrangement is that the rotational moment of inertia of the connecting portion 140 is relatively small, which allows the connecting portion 140 to be rotated at relatively high speeds.

Still another advantage of the canard assembly 120 described above is that the connecting portion 140 can include an intermediate region 142 that is vertically offset from the attachment portions 141. An advantage of this feature is that the canard housing 113 into which the connecting portion 140 fits can be vertically offset over the aisle 114 of the pressurized cabin 111, allowing for greater mobility of the passengers within.

Yet another feature of an embodiment of the canard assembly 120 is that it can include an all-moving, high rotation rate central portion 133 and an independently movable trailing edge device 134. The design, when coupled with a fly-by-wire control system, can allow for the rapid attainment of maximum control authority when needed, while still maintaining the ability to position the surfaces optimally for best airplane performance. This design can also reduce the size of the canard assembly 120, thus providing weight and cost benefits to the aircraft on which it is installed. Another advantage of this arrangement is that the trailing edge devices 134 on opposite sides of the fuselage 110 can be independently actuated in an asymmetric fashion to generate yaw control, which can allow for a reduction in the size of the aircraft vertical tails, providing another potential weight and cost benefit.

In other embodiments, the canard assembly can have other arrangements that also have a reduced impact on the volume of the pressurized cabin 111 of the fuselage 110. For example, FIG. 10 is an enlarged, partially-sectional isometric view of a canard assembly 520 in accordance with an alternate embodiment of the invention. In this embodiment, the canard assembly 520 includes two separate airfoil portions 530a and 530b, each of which is driven by an actuator assembly 560 in accordance with the invention. Thus, the above-noted advantages can be realized in a variety of different embodiments, including embodiments having multiple control surface actuator assemblies in accordance with the invention.

The canard assembly 520 further has a first connecting portion 540a and a second connecting portion 540b. Each connecting portion 540 extends into the fuselage 110 (FIG. 4) and includes a corresponding attachment portion 541. The attachment portions 541 can each include two bearings 544 that support the airfoil portions 530 in a dual cantilevered arrangement. Each connecting portion 540 can also be coupled to an actuator 560 to drive the airfoil portions 530 through a range of angles at a range of angular velocities generally similar to those described above with reference to FIGS. 3–9. The structure required to support and operate the actuators 560 can be positioned in opposing vertically aligned, closet-type structures in the fuselage 110. Accordingly, an advantage of this arrangement is that it can have a reduced impact on the head room within the pressurized cabin 111. Conversely, an advantage of the arrangement described above with reference to FIGS. 3–9 is that it does not have a substantial impact on the lateral volume of the pressurized cabin 111. A further advantage of the arrangement described above with reference to FIGS. 3–9 is that the connecting portion 140 extends entirely through the fuselage 110 and is attached to both airfoil portions 130, which is generally structurally more efficient than the cantilevered arrangement shown in FIG. 10.

While certain embodiments of the invention have been illustrated and described, as noted above, many changes can be made without departing from the spirit and scope of the invention. Accordingly, the scope of the invention is not limited by the disclosure of these representative embodiments, but rather, the invention should be determined entirely by reference to the claims that follow.

What is claimed is:

1. An assembly for rotatably actuating a rotatable member about a rotation axis, comprising:

an extendible actuator having a first end and a second end, the actuator being extendible along an actuator axis that does not intersect the rotation axis;

a drive member having a first portion pivotally coupled to the second end and a second portion non-pivotally coupled to the rotatable member, the second portion being spaced apart from the first portion, the drive member further having a third portion spaced apart from the first and second portions in a non-linear orientation; and a reaction link having an anchoring end pivotally coupled to the first end of the extendible actuator, and a driving end pivotally coupled to the third portion of the drive member.

2. The assembly of claim 1, wherein the drive member is a triangular plate.

3. The assembly of claim 1, wherein the drive member is a triangular frame.

4. The assembly of claim 1, wherein the drive member includes a portion having an approximately triangularly-shaped cross-section.

5. The assembly of claim 1, further comprising a hangar link having a base end pivotably coupled to the extendible actuator proximate the first end.

6. The assembly of claim 1, wherein the drive member is approximately co-planar with the extendible actuator, and wherein the reaction link is approximately co-planar with the extendible actuator and the drive member.

7. The assembly of claim 1, wherein the drive member is approximately co-planar with the reaction link.

8. The assembly of claim 1, wherein the reaction link is approximately co-planar with the extendible actuator.

9. The assembly of claim 1, wherein the drive member is approximately co-planar with the extendible actuator and the reaction link is laterally offset from the extendible actuator, the actuator being coupled to reaction link by a first laterally-extending connecting member, and the third portion of the drive member being coupled to the reaction link by a second laterally-extending connecting member.

10. The assembly of claim 1, wherein the reaction link is approximately co-planar with the extendible actuator and the drive member is laterally offset from the extendible actuator, the actuator being coupled to the first portion of the drive member by a first laterally-extending connecting member, and the reaction link being coupled to the third portion of the drive member by a second laterally-extending connecting member.

11. The assembly of claim 1, wherein the reaction link and the drive member are laterally offset from the extendible actuator, the actuator being coupled to the first portion of the drive member by a first laterally-extending connecting member, and the actuator being coupled to the reaction link by a second laterally-extending connecting member.

12. The assembly of claim 1, wherein the second portion of the drive member is rigidly coupled to the rotatable member.

13. An assembly for controlling an aircraft, comprising:

a control surface coupled to a rotatable shaft, the shaft being rotatable about a rotation axis;

an actuation assembly operatively coupled to the shaft, the actuation assembly including an extendible actuator having a first end and a second end, the actuator being extendible along an actuator axis that does not intersect the rotation axis;

a drive member having a first portion pivotally coupled to the second end of the extendible actuator and a second portion non-pivotally coupled to the shaft, the second portion being spaced apart from the first portion, the drive member further having a third portion spaced apart from the first and second portions in a non-linear orientation; and a reaction link having an anchoring end pivotally coupled to the first end of the extendible actuator, and a driving end pivotally coupled to the third portion of the drive member.

14. The assembly of claim 13, wherein the drive member is a triangular plate.

15. The assembly of claim 13, wherein the drive member is a triangular frame.

16. The assembly of claim 13, wherein the drive member includes a portion having an approximately triangularly-shaped cross-section.

17. The assembly of claim 13, further comprising a hangar link having a base end pivotally coupled to the extendible actuator proximate the first end.

18. The assembly of claim 13, wherein the control surface includes a canard surface.

19. The assembly of claim 13, wherein the drive member is approximately co-planar with both the extendible actuator and the reaction link.

20. The assembly of claim 13, wherein the drive member is approximately co-planar with the extendible actuator and the reaction link is laterally offset from the extendible actuator, the actuator being coupled to reaction link by a first laterally-extending connecting member, and the third portion of the drive member being coupled to the reaction link by a second laterally-extending connecting member.

21. The assembly of claim 13, wherein the reaction link is approximately co-planar with the extendible actuator and the drive member is laterally offset from the extendible actuator, the actuator being coupled to the first portion of the drive member by a first laterally-extending connecting member, and the reaction link being coupled to the third portion of the drive member by a second laterally-extending connecting member.

22. The assembly of claim 13, wherein the reaction link and the drive member are laterally offset from the extendible actuator, the actuator being coupled to the first portion of the drive member by a first laterally-extending connecting member, and the actuator being coupled to the reaction link by a second laterally-extending connecting member.

23. A canard assembly for an aircraft, comprising:

a shaft that is rotatable about a rotation axis;

at least one control surface coupled to the shaft and adapted to be positioned external to the aircraft;

an actuation assembly operatively coupled to the shaft, the actuation assembly including an extendible actuator having a first end and a second end, the actuator being extendible along an actuator axis that does not intersect the rotation axis;

a drive member having a first portion pivotally coupled to the second end of the extendible actuator and a second portion non-pivotally coupled to the shaft, the second portion being spaced apart from the first portion, the drive member further having a third portion spaced apart from the first and second portions in a non-linear orientation; and a reaction link having an anchoring end pivotally coupled to the first end of the extendible actuator, and a driving end pivotally coupled to the third portion of the drive member.

24. The canard assembly of claim 23, wherein the shaft includes a first part having a first longitudinal axis, a second part having a second longitudinal axis, and a connecting portion coupling the first and second parts, the second longitudinal axis being other than co-linear with the first longitudinal axis.

25. The canard assembly of claim 24 wherein the second longitudinal axis is parallel with the first longitudinal axis.

26. The canard assembly of claim 24 wherein the drive member is non-pivotally coupled to the first part and the control surface is coupled to the second part.

27. The canard assembly of claim 23, further comprising an interface assembly operatively coupled to a fuselage portion of the aircraft, the shaft extending through and being rotatably supported by the interface assembly.

28. The canard assembly of claim 23 wherein the shaft includes a first part projecting outwardly from a first side of the aircraft and a second part projecting outwardly from a second side of the aircraft, and wherein the at least one control surface includes a first control surface coupled to the first part and a second control surface coupled to the second part.

29. The canard assembly of claim 28, further comprising a first interface assembly operatively coupled to the first side of the aircraft and a second interface assembly operatively coupled to the second side of the aircraft, the shaft extending through and being rotatably supported by the first and second interface assemblies.

30. The canard assembly of claim 23 wherein the shaft is a first shaft and the actuation assembly is a first actuation assembly, further comprising:
   a second shaft that is rotatable about a second rotation axis;
   at least one second control surface coupled to the second shaft and adapted to be positioned external to the aircraft; and
   a second actuation assembly operatively coupled to the second shaft.

31. The canard assembly of claim 23, further comprising a hangar link having a base end pivotally coupled to the extendible actuator proximate the first end.

32. The canard assembly of claim 23, wherein the drive member is approximately co-planar with both the extendible actuator and the reaction link.

33. The canard assembly of claim 23, wherein the drive member is approximately co-planar with the extendible actuator and the reaction link is laterally offset from the extendible actuator, the actuator being coupled to reaction link by a first laterally-extending connecting member, and the third portion of the drive member being coupled to the reaction link by a second laterally-extending connecting member.

34. The canard assembly of claim 23, wherein the reaction link is approximately co-planar with the extendible actuator and the drive member is laterally offset from the extendible actuator, the actuator being coupled to the first portion of the drive member by a first laterally-extending connecting member, and the reaction link being coupled to the third portion of the drive member by a second laterally-extending connecting member.

35. The canard assembly of claim 23, wherein the reaction link and the drive member are laterally offset from the extendible actuator, the actuator being coupled to the first portion of the drive member by a first laterally-extending connecting member, and the actuator being coupled to the reaction link by a second laterally-extending connecting member.

36. The canard assembly of claim 23, wherein the actuator includes a motor that operatively drives a ball screw, and a ball nut operatively coupled to the ball screw, the ball nut further being pivotally coupled to the first portion of the drive member.

37. An aircraft comprising:
   a fuselage;
   a propulsion system operatively coupled to the fuselage; and
   a control system operatively coupled to the fuselage and including
      a control surface coupled to a rotatable shaft, the shaft being rotatable about a rotation axis;
      an actuation assembly operatively coupled to the shaft, the actuation assembly including
         an extendible actuator having a first end and a second end, the actuator being extendible along an actuator axis that does not intersect the rotation axis;
         a drive member having a first portion pivotally coupled to the second end of the extendible actuator and a second portion non-pivotally coupled to the shaft, the second portion being spaced apart from the first portion, the drive member further having a third portion spaced apart from the first and second portions in a non-linear orientation; and
         a reaction link having an anchoring end pivotally coupled to the first end of the extendible actuator, and a driving end pivotally coupled to the third portion of the drive member.

38. The aircraft of claim 37, wherein the actuation assembly further comprises a hangar link having a base end pivotally coupled to the extendible actuator proximate the first end of the actuator and a support end pivotally coupled to the fuselage.

39. The aircraft of claim 37, wherein the control surface includes a canard surface.

40. The aircraft of claim 37, wherein the drive member is approximately co-planar with both the extendible actuator and the reaction link.

41. The aircraft of claim 37, wherein the drive member is approximately co-planar with the extendible actuator and the reaction link is laterally offset from the extendible actuator, the actuator being coupled to reaction link by a first laterally-extending connecting member, and the third portion of the drive member being coupled to the reaction link by a second laterally-extending connecting member.

42. The aircraft of claim 37, wherein the reaction link is approximately co-planar with the extendible actuator and the drive member is laterally offset from the extendible actuator, the actuator being coupled to the first portion of the drive member by a first laterally-extending connecting member, and the reaction link being coupled to the third portion of the drive member by a second laterally-extending connecting member.

43. A method of rotatably actuating a rotatable member about a rotation axis, comprising:
   providing a drive member having a first portion pivotally coupled to a first end of an extendible actuator and a second portion non-pivotally coupled to the rotatable member, the second portion being spaced apart from the first portion;
   providing a reaction link having a first end pivotally coupled to a third portion of the drive member, the third portion being spaced apart from the first and second portions in a non-linear orientation, the reaction link having a second end pivotally coupled to a second end of the actuator; and
   extending the actuator to apply a force against the first portion of the drive member and to rotate the rotatable member about the rotation axis.

44. The method of claim 43, wherein providing a drive member includes providing a triangular plate.

45. The method of claim 43, wherein providing a drive member having a first portion pivotally coupled to a first end of an extendible actuator includes providing a drive member that is approximately co-planar with the extendible actuator.

46. The method of claim 43, wherein providing a reaction link having a first end pivotally coupled to a third portion of the drive member includes providing a reaction link that is approximately co-planar with the drive member.

47. The method of claim 43, wherein extending the actuator to apply a force against the first portion of the drive member includes extending the actuator along an actuator axis that does not intersect the rotation axis.

48. The method of claim 43, wherein extending the actuator to apply a force against the first portion of the drive member includes extending the actuator to apply a force against the first portion of the drive member and a corresponding force in the reaction link, the force and the corresponding force combining to rotate the rotatable member.

49. The method of claim 43, wherein the rotatable member includes a control surface of an aircraft, and wherein extending the actuator to apply a force against the first portion of the drive member and to rotate the rotatable member including rotating the control surface.

50. The method of claim 49, wherein the control surface includes a canard, and wherein rotating the control surface includes rotating the canard.

* * * * *